Patented Oct. 29, 1935

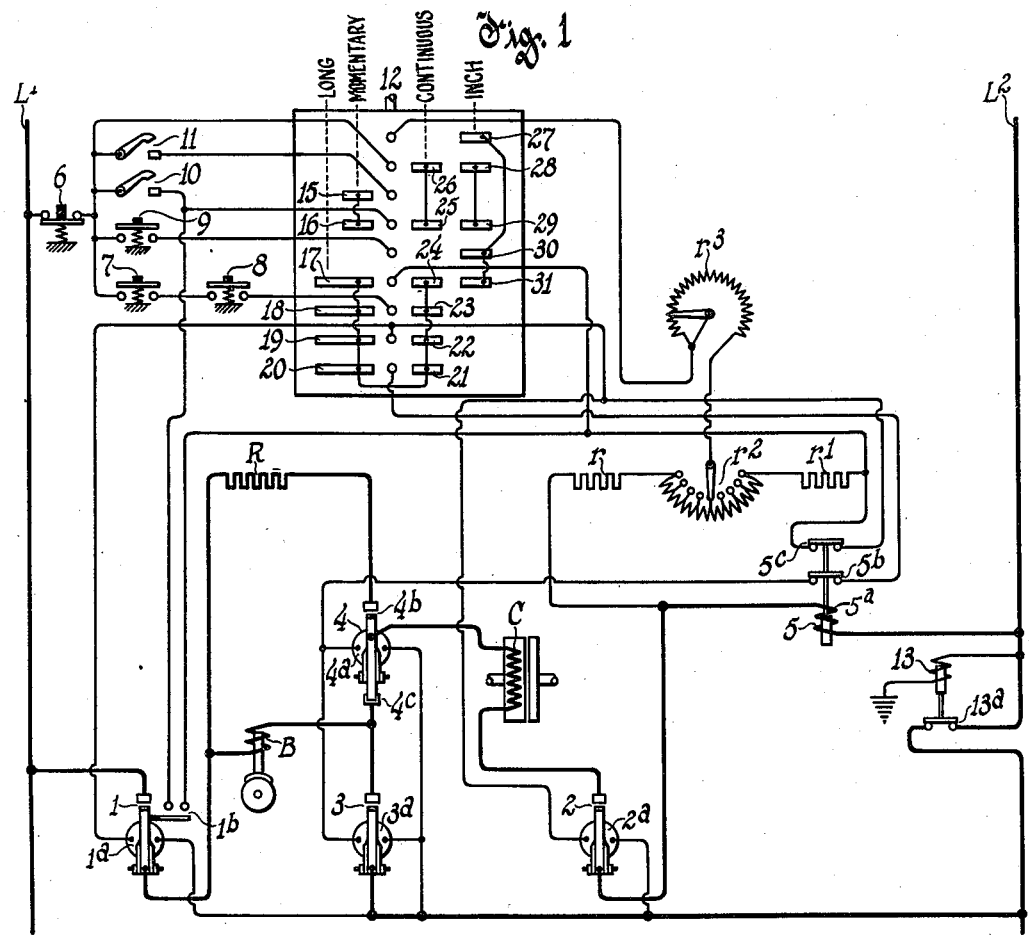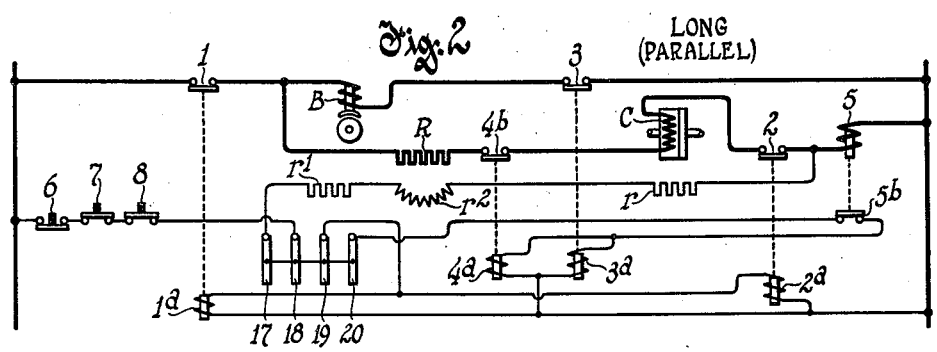

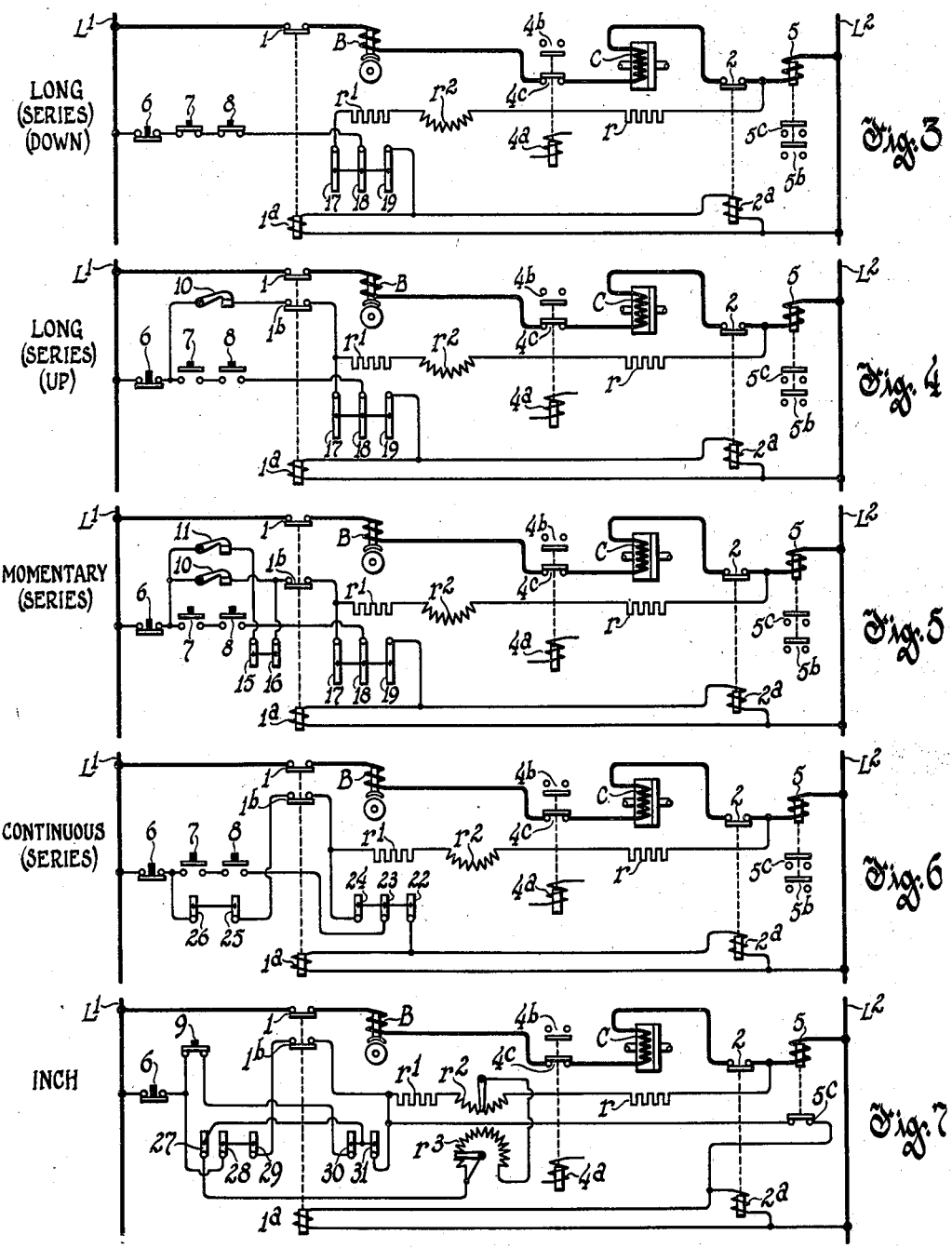

2,018,720

UNITED STATES PATENT OFFICE 2,018,720

ELECTROMAGNETIC CONTROLLER FOR POWER DRIVEN MACHINES

Howard E. Hodgson, Wauwatosa, Wis., assignor to Cutler-Hammer, Inc., Milwaukee, Wis., a corporation of Delaware Application January 10, 1935, Serial No. 1,162

12 Claims. (Cl. 192—12)

This invention relates to electromagnetic controllers for power driven machines and more particularly to controllers of the type comprising an electromagnetic clutch through which drive is effected, and further comprising an electromagnetically controlled brake.

While not limited thereto, the invention is especially applicable to controllers for power driven forming presses which commonly are driven through electromagnetic clutches and provided with electromagnetically controlled brakes to be set when their clutches are deenergized. The clutches vary in form but all are designed to be energized to establish driving connections and to interrupt driving connections when deenergized. On the other hand, the brakes which also vary in form are designed to be set when they are deenergized and to be released by energization thereof, and some have experienced difficulty in providing for operation of the clutch and brake in the desired sequence, particularly in starting. As will be apparent, it is desired in starting to have the brake released at the instant that the clutch establishes driving connections, whereas in stopping it is desired to have the clutch released or substantially released at the instant that the brake sets, and while I have found that the desired operation of the clutch and brake may be obtained without special control means by properly designing the clutch and brake there appears to be a somewhat general feeling that it is necessary to resort to employment of special control means to avoid interference of the clutch and brake, particularly in starting.

The present invention has among its objects to provide a controller which will insure against establishment of driving connections by the clutch prior to release of the brake without need of careful design of the clutch and brake, and which in comparison with heretofore proposed controllers will be more simple and reliable and more advantageous in other respects.

Another object is to provide without resort to employment of dash pot retarder switches or the like a controller of the aforementioned character which will enable the driven machine to be operated in a given period a greater number of times than is possible where dash pot retarded switches or the like affording under all conditions an adequate time element are employed.

Another object is to provide such a controller wherein the windings of the clutch and brake are during drive of the driven machine connected in series whereby an open circuit at any point in the clutch and brake connections will deenergize both the clutch and brake causing the clutch to disengage and the brake to set.

Another object is to provide a controller of the aforementioned character capable of quick and easy adjustment to provide for control of the driven machine in various ways including inching limited to steps of predetermined extent.

Other objects and advantages of the invention will hereinafter appear.

The accompanying drawings illustrate diagrammatically one embodiment of the invention which will now be described, it being understood that the invention is susceptible of embodiment in other forms without departing from the scope of the appended claims.

In the drawings, Figure 1 shows a controller including means for adjusting the same to afford control of the driven machine in various ways, and Figs. 2, 3, 4, 5, 6, and 7 are simplified diagrammatic views of various sets of connections afforded by the means shown in Fig. 1.

The controller illustrated in the drawings is one designed for a well known type of forming press, not shown, such press having a slide to be raised and lowered by power through driving connections including a crank which provides for reversals of the slide without requiring reversals of the driving shaft. In practice it is sometimes desired to provide for lowering of the slide only while the operator's hands are engaged in holding certain control elements, return of the slide to its extreme up position being automatic. Again it is sometimes desired to effect a complete cycle of movement of the slide when a control element is operated only momentarily. Also it is sometimes desired to have the slide operate continuously through a number of cycles and it is commonly desired to have provision for inching the slide in steps and for requiring repeated operation of a control element for effecting each step of operation after the first.

The controller illustrated provides for such control of a forming press, assuming the press to be provided with a suitable brake to be released by winding B of Fig. 1, and a suitable clutch to be engaged by energization of winding C, Fig. 1. Further referring to Fig. 1, the controller illustrated therein additionally comprises electromagnetic switches 1 to 4, inclusive, for controlling the circuits of the brake and clutch windings, a resistance R for one of said circuits, an electroresponsive relay 5 for controlling certain of said switches, fixed resistances $r$ and $r^1$, a main rheostat $r^2$ and a vernier rheostat $r^3$ for certain of the control circuits, push button switches 6, 7, 8, and 9 included in certain of the control circuits and a drum type controller 12 for commutating the control circuits to afford control of the driven machine in different ways by operation of the push button switches. The circuits mentioned are supplied from lines $L^1$, $L^2$ and the controller illustrated further comprises an overload relay 13 having its winding connected between line $L^2$ and ground.

The electromagnetic switches 1, 2 and 3 are of the single pole, single throw type, while the electromagnetic switch 4 is of the single pole, double throw type having normally open contacts $4^b$ and normally closed contacts $4^c$, it of course being understood that the switch 4 might be of the single throw type having normally closed auxiliary contacts to take the place of contacts $4^c$. These switches when energized connect the brake winding B and the clutch winding C in parallel across lines $L^1$ and $L^2$, as illustrated in the simplified diagram Fig. 2, the clutch winding branch of the circuit having included therein a fixed resistance R. On the other hand, when the switches 3 and 4 are deenergized, switches 1 and 2 being maintained energized, the brake winding B and the clutch winding C are thrown into series relation, as illustrated in simplified diagram Fig. 3. As will hereinafter appear, the switches 1 and 2 are energized and maintained energized for all operations of the machine, whereas switches 3 and 4 are also energized for starting except in inching, switches 3 and 4 being subsequently deenergized automatically by the relay 5.

Upon establishment of the aforementioned parallel connections (Fig. 2) for the brake and clutch windings it will be observed that the brake winding is subjected to the full line voltage, whereas the clutch winding is subjected to a lower voltage as the result of inclusion in its circuit of the resistance R. Thus assuming the brake winding to be designed for over-excitation by the full line voltage its connection as shown in Fig. 2 will cause it to respond very quickly, whereas the clutch winding, due to inclusion in its circuit of resistance R, will be relatively slow to respond, whereby full release of the brake prior to engagement of the clutch may be insured with a properly designed clutch, but without necessitating extremely careful design of the clutch. The resistance R is preferably of a value approximating the resistance value of the brake winding. The resistance R serves in addition to the purpose hereinbefore set forth that of preventing a possible momentary short-circuit through the contacts of switches 3 and 4 during the transition from parallel to series connection of the clutch and brake winding.

As will appear from Figs. 1 and 2, the winding $5^a$ of relay 5 is included in the circuit of the clutch winding C when parallel connections are established and said relay is designed to respond under certain conditions to deenergize switches 3 and 4 to change the connection of the windings B and C from parallel to series. The relay which has normally closed contacts $5^b$ and $5^c$ is designed to respond to effect the aforementioned circuit commutations only when the current flow therethrough attains a certain value and due to the high inductance of the clutch windings the current flowing in the circuit of the clutch winding and the relay coil is slow to build up to said value, which is selected for delay of response of the relay until the brake winding has responded to disengage the brake. For example, if it be assumed that relay 5 requires a thousand ampere turns to close the control may be so designed that upon initial establishment of parallel connections the relay winding will obtain sufficient current as regulated by the amount of fixed resistance to develop approximately 500 ampere turns, in which case it would be necessary for the current in the clutch winding branch to build up to a value sufficient to develop 500 ampere turns before the relay would respond, it being understood that the design might be such as to render the relay responsive upon a greater or less build up of the current in the clutch winding circuit. The series connection of the clutch and brake windings maintains said windings energized for running, at the same time reducing the excitation of the brake winding to normal and affording the aforedescribed protection against continuing energization of one winding should the other winding fail. Fig. 2 shows an additional supply branch for the winding of relay 5, namely that inclusive of resistances $r$, $r^1$ and $r^2$, which branch is here neglected, the same being provided for a purpose hereinafter set forth.

The relay 5 is also utilized in inching (Fig. 7), but in a different capacity. In inching full release of the brake is not desirable and starting is effected by establishment of series connections, wherefore in inching the aforedescribed functioning of the relay is unnecessary. In inching, the relay 5 is utilized to limit operation of the press slide to steps, the winding of said relay being connected in series with the brake and clutch windings, as heretofore set forth. With this connection, as hereinbefore set forth, the current supplied to the winding of relay 5 will initially be small, due to the inductance of the circuit, and will thereafter gradually increase. Also upon establishment of inching connections there is provided for the winding of relay 5, as shown in simplified diagram Fig. 7, a supply circuit paralleling the clutch and brake windings, which parallel circuit includes the fixed resistances $r$ and $r^1$ and the main and vernier rheostats $r^2$, $r^3$ by means of which the relay may be made responsive to current increase in the circuit of the brake and clutch windings variable between wide limits to afford a time element in response of the relay variable to afford a press stroke ranging between a fraction of an inch and several inches. The relay upon responding deenergizes the switches 1 and 2 to interrupt circuit through the brake winding and clutch winding to stop the press while the branch supply for the winding of relay 5 is maintained to maintain said relay energized and hence to prevent restarting of the press until said maintaining circuit is opened manually. Thus the relay 5 affords simple and effective means to limit inching to fixed steps each requiring a special manual operation and to enable through adjustment of the resistances associated therewith adjustment of the individual step through a wide range.

Referring to the push button switches, the switch 6 is of the normally closed type and constitutes a stop switch, while switches 7, 8, and 9 are of the normally open type, the switches 7 and 8 being representative of the usual "start" switches, and the switch 9 being representative of the usual "inch" switch. As will be understood, the number of switches for each function may be increased as desired, there preferably being a sufficient number of starting switches to require use of both hands of each attendant to effect starting.

Referring to the limit switches 10 and 11, the same are operatively connected to the press in a well known manner. Switch 10 is maintained open throughout the down stroke of the press slide until it reaches its limit, said switch 10 thereupon being closed and being maintained closed until the press slide nears its up limit. On the other hand, limit switch 11 is maintained closed throughout the cycle of the press slide until it nears its up limit whereupon said switch is opened and subsequently reclosed by drift of the press.

The drum type commutating switch 12 is of a well known form comprising a series of contact buttons and cooperating contact segments 15 to 31 affording well known circuit commutations rendering the press controllable in different ways by manipulation of the aforedescribed push button switches and limit switches. The switch 12 has four different positions, namely, so-called "long", "momentary", "continuous" and "inch" positions enabling establishment by the push button switches and limit switches of different circuits, all illustrated in the simplified diagrams Figs. 2 to 7. Figs. 2 to 7 show the contacts of the switch 12 employed in each instance, and hence further description of the switch 12 is deemed unnecessary.

Assuming switch 12 to be set in "long" position, closure of the start push button switches 7 and 8 effects completion of the circuits shown in Fig. 2. More specifically, the windings 1ª and 2ª of switches 1 and 2 are connected in parallel between lines L¹ and L² through push button switches 6, 7 and 8, and contacts 18 and 19 of switch 12, while the windings 3ª and 4ª of switches 3 and 4 are connected in parallel through said push button switches and contacts 18 and 20 of switch 12, the latter windings also having in series therewith normally closed contacts 5ᵇ of relay 5. Such connection of windings 1ª, 2ª, 3ª and 4ª effects response of switches 1, 2, 3 and 4 to connect the brake and clutch windings in parallel between lines L¹ and L², as shown, with the heretofore explained result of effecting quick response of the brake winding, then response of the clutch winding and promptly thereafter response of the relay 5 to change the connections of the brake and clutch windings from parallel to series, the series connection being shown in Fig. 3. Referring to Fig. 3, the switches 1 and 2 together with the down contacts 4ᶜ of switch 4 complete the series connections for the brake and clutch windings, and as will be understood the down contacts of switch 4 close upon deenergization of switches 3 and 4 by the aforedescribed response of relay 5. Further referring to Fig. 3, the connections shown other than those of the brake and clutch windings are the same as in Fig. 2, the switches 1 and 2 being maintained energized but being dependent for continued energization upon manual retention of the push button switches 7 and 8 in closed position. However, when the press slide reaches its down limit, limit switch 10 closes, supplementing the connections of Fig. 3 as shown in Fig. 4. More specifically, limit switch 10 completes a connection from line L¹ through push button switch 6 and auxiliary contacts 1ᵇ of switch 1, to and through contacts 17 and 19 of switch 12 to the windings 1ª and 2ª, thereby maintaining said windings energized independently of push button switches 7 and 8. Consequently the press will complete its return stroke without further retention of the push button switches 7 and 8, the limit switch 10 opening when the press slide nears its upper limit to deenergize switches 1 and 2, thereby disconnecting the brake and clutch windings to stop the press. As will appear from Figs. 2, 3, and 4, the remaining connections include in addition to those mentioned a circuit from line L¹ to and through resistance $r$, rheostat $r^2$ and resistance $r^1$ to a point between clutch winding C and the winding 5ª of relay 5, this branch circuit being provided for inching control heretofore referred to and obtained by establishment of the connections shown in Fig. 7.

Assuming switch 12 to be set in "momentary" position, depression of the push button switches effects establishment of the connections shown in Fig. 2, whereas switch 12 additionally establishes the limit switch connections shown in Fig. 5. Such limit switch connections are preserved when the relay 5 responds to establish series connection of the brake and clutch windings for running as shown in Fig. 5. Comparing the connections shown in Fig. 5 with the connections shown in Fig. 4, they are the same except for addition of a circuit from line L¹ through limit switch 11 to and through contacts 15 and 16 of switch 12, auxiliary contacts 1ᵇ of switch 1 and contacts 17 and 19 of switch 12, to the windings 1ª and 2ª of switches 1 and 2. As will be apparent, limit switch 11 being closed during down stroke of the press said limit switch is thus rendered effective by the connection described to maintain the switches 1 and 2 energized independently of the push button switches 7 and 8. Accordingly if such push button switches are closed momentarily and then released the limit switch will maintain running connections throughout the cycle until the slide nears its up limit, as heretofore explained. In this connection it will be noted that the circuits between the limit switches and the windings of switches 1 and 2 extend through auxiliary contacts 1ᵇ of switch 1, and that assuming only a brief interval between opening of limit switch 10 and reclosure of limit switch 11 switches 1 and 2 will open and opening of contacts 1ᵇ will prevent reenergization of switches 1 and 2 by reclosure of limit switch 11.

Assuming setting of the switch 12 in "continuous" position momentary depression of push button switches 7 and 8 will effect continuous run of the press with the connections shown in Fig. 6, but the connections shown in Fig. 2 will be established initially and maintained until the relay 5 responds to establish the series connections of Fig. 6. The circuits shown in Fig. 6 are the same as those shown in Fig. 3, with the addition of a circuit extending from line L¹ to and through the push button switch 6, contacts 26 and 25 of switch 12, and auxiliary contacts 1ᵇ of switch 1 to the windings of switches 1 and 2. Thus the switches 1 and 2 are maintained energized independently of the push button switches 7 and 8 and also independently of both limit switches, wherefore the press will operate until stopped by depression of push button switch 6. In this instance the contacts 21 to 24 of the switch 12 are utilized in lieu of the contacts 17 and 18, contact 21 being utilized only for parallel connections.

Assuming setting of switch 12 in "inch" position the connections when push button switch 9 is depressed will be those shown in Fig. 7 which provide for the heretofore described series connection of the brake and clutch windings. More specifically, a circuit is established from line L¹ through push button switches 6 and 9, to and through contacts 30 and 31 of switch 12, to and through contacts 5c of relay 5, and thence to and through the windings of switches 1 and 2 in parallel to line L². Thus switches 1 and 2 are energized subject to deenergization by response of relay 5. Also a circuit is established from line L¹ to and through contacts 30 and 31 of switch 12, as previously traced, and thence through resistance r¹, rheostat r² and resistance r to the winding of relay 5, while an additional circuit is established from contact 30 of switch 12 to contact 27 thereof and thence to and through the vernier rheostat r³ to the slider of rheostat r². Thus according to the adjustments of said rheostats the relay 5 is rendered responsive subject to a given time element to deenergize switches 1 and 2, thereby disconnecting the clutch and brake windings to stop the press. Relay 5, as will be apparent, is maintained energized until push button switch 9 is released, and thus continued depression of switch 9 will not effect reenergization of switches 1 and 2 for restarting. To restart the switch 9 must be released and then reoperated. Contacts 28 and 29 of switch 12 together with auxiliary contacts 1b of switch 1 provide a shunt around the inching switch 9 to render momentary operation of the latter sufficient to effect a full inching step.

Overload relay 13 having its operating winding connected between line L² and ground is rendered responsive upon grounding of the system and its response opens contacts 13a included in line L² ahead of the connections of the windings of switches 1 to 4. Accordingly response of said overload relay will disconnect the windings of switches 1 to 4, thereby causing said switches to open and disconnect the brake and clutch windings.

What I claim as new and desire to secure by Letters Patent is:

1. In a controller for a power driven machine, in combination, an electromagnetically controlled clutch for the machine drive, an electromagnetically controlled brake for the machine and control means for the windings of said clutch and brake providing for connection in circuit of the windings of both simultaneously and for subjecting the winding of said brake to over-excitation, said control means including means to reduce the excitation of said brake winding in response to electrical conditions influenced by the winding of said clutch.

2. In a controller for a power driven machine, in combination, an electromagnetically controlled clutch for the machine drive, an electromagnetically controlled brake for the machine and control means for the windings of said clutch and brake providing for connection in circuit of the windings of both simultaneously and for subjecting the winding of said brake to over-excitation, said control means including electroresponsive means having a winding thereof associated with the winding of said clutch and responsive to electrical conditions influenced by the latter winding to reduce the excitation of said brake winding.

3. In a controller for a power driven machine, in combination, an electromagnetically controlled clutch for the machine drive, an electromagnetically controlled brake for the machine and means for connecting control windings of said clutch and brake to a source of supply first in parallel and then in series, said means comprising automatic means to effect change from parallel to series connections.

4. In a controller for a power driven machine, in combination, an electromagnetically controlled clutch for the machine drive, an electromagnetically controlled brake for the machine and means for connecting control windings of said clutch and brake to a source of supply first in parallel and then in series, said means comprising means responsive to a varying electrical condition in the initially established connections to effect change from parallel to series connections automatically.

5. In a controller for a power driven machine, in combination, an electromagnetically controlled clutch for the machine drive, an electromagnetically controlled brake for the machine and means for connecting control windings of said clutch and brake to a source of supply first in parallel and then in series, said means comprising electroresponsive means having a winding subjected to the current flowing through the clutch winding when the clutch and brake windings are connected in parallel and responsive to effect change from parallel to series connections.

6. In a controller for a power driven machine, in combination, an electromagnetically controlled clutch for the machine drive, an electromagnetically controlled brake for the machine, an electroresponsive relay, and means for connecting the windings of said clutch and brake to a supply source in parallel with a winding of said relay in series with said clutch winding subject to change in the connection of said clutch and brake windings from parallel to series upon response of said relay.

7. In a controller for a power driven machine, in combination, an electromagnetically controlled clutch for the machine drive, an electromagnetically controlled brake for the machine, means to connect the windings of said clutch and brake in series to a supply source for inching of the machine and for running the machine to connect said windings to a supply source first in parallel and then in series, said means including electroresponsive means having connections rendering the same responsive to a certain varying electrical condition to effect disconnection of said clutch and brake windings after a given inching operation of the machine and responsive to a varying electrical condition when said clutch and brake windings are in parallel to effect change from parallel to series connection of said windings.

8. In a controller for a power driven machine, in combination, an electromagnetically controlled clutch for the machine drive, an electromagnetically controlled brake for the machine, means to connect the windings of said clutch and brake in series to a supply source for inching of the machine and for running the machine to connect said windings to a supply source first in parallel and then in series, said means including electroresponsive means having a winding subjected at all times to the current traversing the winding of said clutch and being responsive when said clutch and brake windings are connected for inching to effect disconnection of both windings and responsive when said clutch and brake windings are connected in parallel to effect change to series connection.

9. In a controller for a power driven machine, in combination, an electromagnetically controlled clutch for the machine drive, an electromagnetically controlled brake for the machine, means to connect the windings of said clutch and brake in series to a supply source for inching of the machine and for running the machine to connect said windings to a supply source first in parallel and then in series, said means including electroresponsive means having connections rendering the same responsive to a certain varying electrical condition during inching of the machine and to a certain varying electrical condition when said clutch and brake windings are in parallel, said electroresponsive means having under the control thereof during inching certain circuit connections and during parallel connection of said clutch and brake other circuit connections.

10. In a controller for a power driven machine, in combination, an electromagnetically controlled clutch for the machine drive, an electromagnetically controlled brake for the machine, means to connect the windings of said clutch and brake in series to a supply source for inching of the machine and for running the machine to connect said windings to a supply source first in parallel and then in series, said means including electroresponsive means having a control winding which is subjected at all times to the current flowing through the clutch winding and which is connected independently of the clutch winding to the supply source of the latter, the first mentioned means also including means which when the clutch and brake windings are in parallel render said electroresponsive means responsive to a certain varying electrical condition to effect change to series relation and which when the clutch and brake windings are connected for inching render said electroresponsive means responsive to a certain varying electrical condition to effect disconnection of the clutch and brake windings.

11. In a controller for a power driven machine, in combination, an electromagnetically controlled clutch for the machine drive, an electromagnetically controlled brake for the machine, electroresponsive means to afford certain automatic control of said clutch and brake and manually controlled means affording optionally parallel or series connection of the windings of said clutch and brake with a winding of said electroresponsive means included between the clutch winding and its source of supply and with an independent connection between the winding of said electroresponsive means and the supply source shunting the first mentioned windings, said manually controlled means when affording said parallel connection further affording connections rendering response of said electroresponsive means effective to establish said series connection and when optionally affording said series connection further affording connections rendering response of said electroresponsive means effective to disconnect from circuit said clutch and brake windings.

12. In a controller for a power driven machine, in combination, an electromagnetically controlled clutch for the machine drive, an electromagnetically controlled brake for the machine, electroresponsive means to afford certain automatic control of said clutch and brake and manually controlled means affording optionally parallel or series connection of the windings of said clutch and brake with a winding of said electroresponsive means included between the clutch winding and its source of supply and with an independent connection between the winding of said electroresponsive means and the supply source shunting the first mentioned windings, said manually controlled means also affording said independent connection a given resistance value when establishing said parallel connection and a different resistance value when establishing said series connection and further affording commutation of circuits controlled by said electroresponsive means to render response of the latter effective selectively to establish series connection of the clutch and brake windings or to disconnect from circuit the clutch and brake windings.

HOWARD E. HODGSON.